No. 741,010. PATENTED OCT. 13, 1903.
W. L. CALDWELL.
VAULT LIGHT CONSTRUCTION.
APPLICATION FILED AUG. 25, 1902.
NO MODEL. 2 SHEETS—SHEET 1.
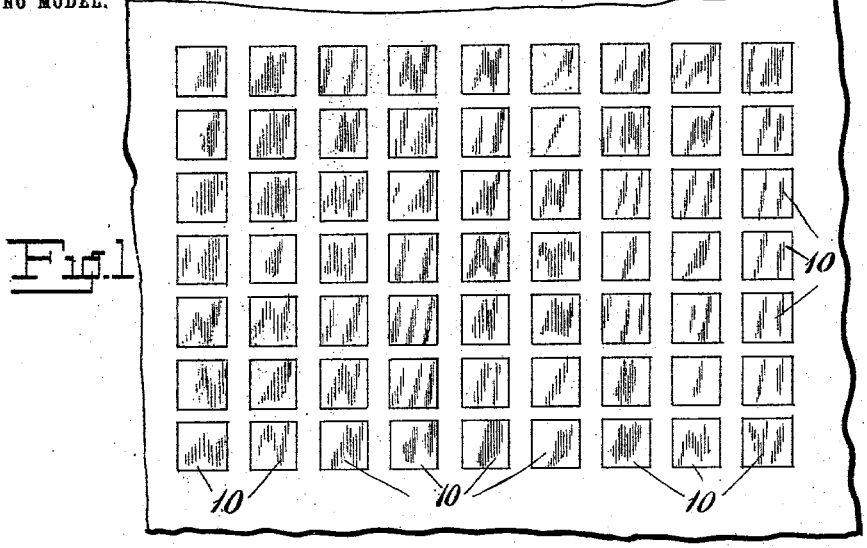
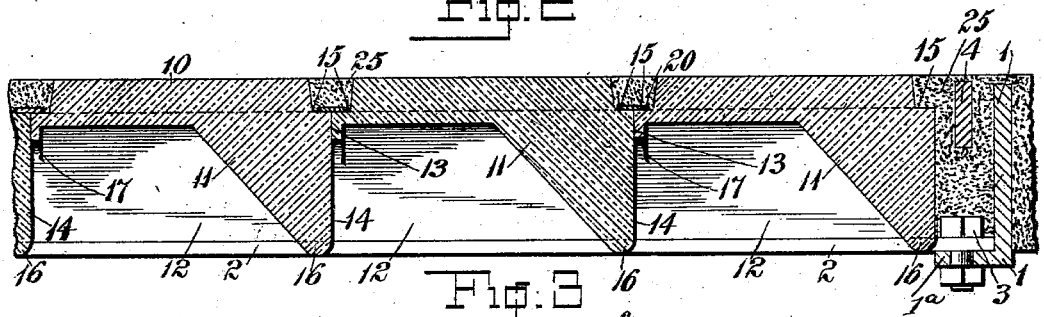
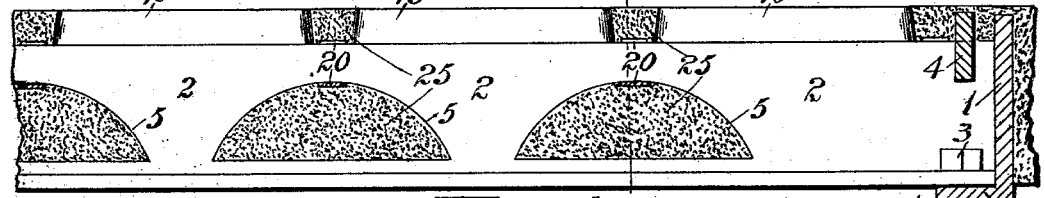
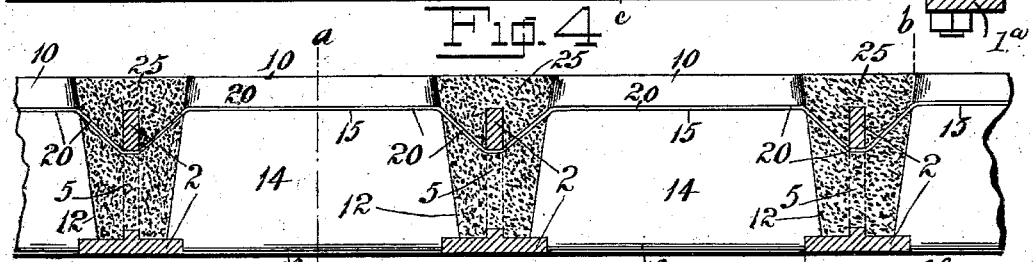

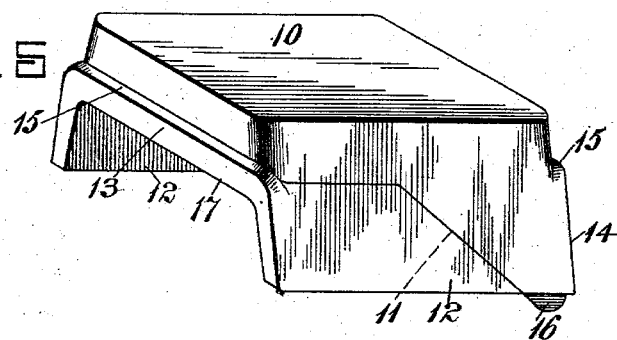
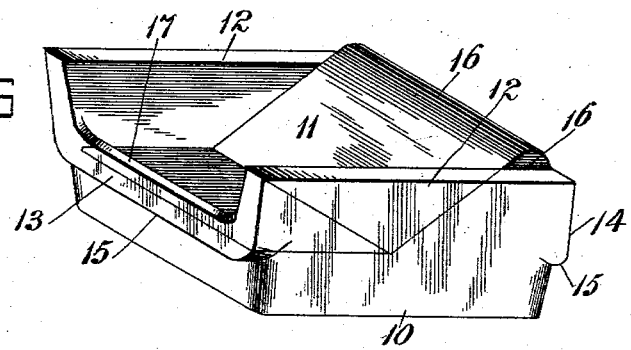
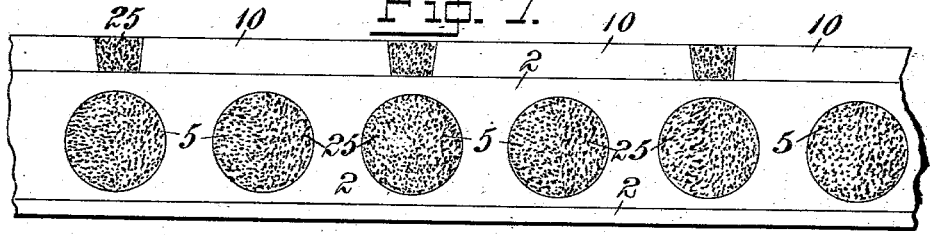
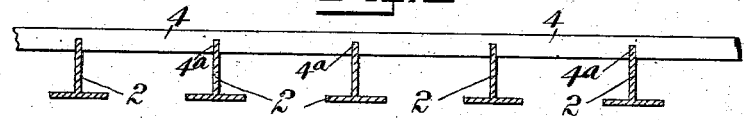

No. 741,010. Patented October 13, 1903.

UNITED STATES PATENT OFFICE.

WILLIAM L. CALDWELL, OF NEW YORK, N. Y.

VAULT-LIGHT CONSTRUCTION.

SPECIFICATION forming part of Letters Patent No. 741,010, dated October 13, 1903.

Application filed August 25, 1902. Serial No. 120,912. (No model.)

*To all whom it may concern:*

Be it known that I, WILLIAM L. CALDWELL, a citizen of the United States, residing in the borough of Manhattan, in the city of New York, and county and State of New York, have invented certain new and useful Improvements in Vault-Light Constructions, of which the following is a specification.

The object of my invention is to produce a more effective, economical, and durable vault-light construction than those heretofore produced.

The main feature of novelty in my present invention consists of a vault-light glass of arch form constructed with plain outwardly-inclined flangeless side walls and centering depending lugs projecting beneath the frame-bars for preventing lateral movement of the glasses upon the latter. This form of glass affords greater strength and a larger lighting area for a given weight and price of glass than any other form of glass for vault-light constructions known to me, and its use renders possible the employment of much larger and stronger frame-bars in the construction. Another advantage due to the use of arch-form glasses having centering depending lugs is that the glasses can be supported entirely above the lower surface of the supporting-frame, thereby avoiding the objectionable projections beneath the frame, as in the ordinary construction, and at the same time the glasses are prevented from moving laterally. These improved arch-form glasses may be molded with prisms or without prisms. When they are formed without prisms, they consist of a tread portion having parallel upper and lower surfaces and integral supporting outwardly-inclined side walls projecting downwardly from the tread portion to form an arched structure adapted to rest upon the supporting-frame. When the glasses are formed with prisms, they comprise a tread portion, a prism portion flush with one end of the glass projecting approximately halfway beneath the tread portion and having its outer surface coincident with the outer surface of the tread portion and supporting outwardly-inclined side walls embracing and formed integral with the tread portion and the prism portion and forming therewith an arched structure. A further advantage of the improved arch form of prism-glass is that it more effectively diffuses the light in a cellar or other room to be lighted, the tread portion allowing the rays of light to pass directly through, while the prism portion refracts the light-rays and throws them back of the vault-light and diffuses them throughout the cellar.

In my improved construction I employ a metal framework of angle-bars having horizontal flanges and parallel inverted-T-frame bars, having horizontal flanges upon which the supporting outwardly-inclined side walls of the glasses rest and between which the centering-lugs depend, and vertical webs formed with transverse slots or openings at intervals to allow the cement or other binding material in which the glasses are embedded to extend through and securely lock the glasses and the frame-bars in place upon the angle-bars. I prefer to arrange the slots or openings in the vertical webs of the T-frame bars at such intervals that the abutting faces of the glasses will be in the same vertical planes as the said openings. I also employ metal straps for passing over suitable horizontal shoulders formed on the glasses and through the slots or openings of the vertical webs for locking the glasses in place upon the framework.

In order that my invention may be fully understood, I will first describe the same with reference to the accompanying drawings and will afterward point out the novelty more particularly in the annexed claims.

Figure 1 is a detail plan view of a portion of a vault-light construction according to my invention. Fig. 2 is a longitudinal sectional view of the same, taken on the line $a\ a$ of Fig. 4. Fig. 3 is a longitudinal sectional view of the same, taken on the line $b\ b$ of Fig. 4. Fig. 4 is a transverse sectional view taken on the line $c\ c$ of Fig. 3. Figs. 5 and 6 are perspective views of one of the improved arch-form prism-glasses. Fig. 7 is a view similar to Fig. 3, showing a slight modification of the invention. Fig. 8 is a detail sectional view showing a spreader for holding the inverted-T-frame bars in position.

In constructing the vault-cover in accordance with my invention I utilize angle-bars 1 for the inner and outer ends of the opening which is to be bridged, having horizontal flanges 1ᵃ. Mounted upon and secured to the horizontal flanges 1ᵃ of these angle-bars 1 are a series of inverted-T-frame bars 2, which are arranged parallel to each other between the supporting angle-bars 1 and are secured at their ends in any suitable manner, such as by means of bolts or rivets 3. It is not always necessary to bolt or rivet the T-frame bars to the angle-bars. To hold the T-frame bars in the proper relative position, I employ spreader-bars 4, having slots 4ᵃ, which fit over and receive the upper edges of the vertical webs of the T-frame bars within the angle-bars 1 over the horizontal flanges of the latter. The vertical webs of these parallel inverted-T-frame bars 2 are formed at intervals with openings 5, which are preferably of segmental or semicircular form, as shown in Fig. 3, but which may be of circular form, as shown in Fig. 7. These openings 5 are spaced, so as to correspond in position with the vertical planes in which the end faces of the glasses abut or come together, for the purpose which will presently be explained.

I employ, preferably, arch-form glasses, such as shown in detail in Figs. 5 and 6 of the drawings, each glass comprising a tread portion 10, downwardly-projecting triangular prism portion 11 flush with one end of the glass and having its outer exposed face coincident or flush with the outer face of the tread portion 10, the outwardly-inclined supporting flangeless side walls 12, embracing the tread portion 10 and prism portion 11, the approximately vertical matched end walls 13 and 14, the latter of which constitutes the vertical face of the prism portion, the horizontal shoulders 15, formed at the ends just beneath the outer surface of the tread portion 10, and the centering depending lugs 16, projecting slightly beneath the lower edges of the side walls 12 and formed by the lower projecting lower end of the prism portion 11. The side walls 12 may be further braced by a shallow web 17, connecting them at the end opposite the prism portion 11, although this web 17 is not essential and if present should be very shallow to avoid interfering with the action of the prism portion which abuts it.

The glasses are placed upon the horizontal flanges of the inverted-T-frame bars 2, so as to be supported by their side walls 12, the T-frame bars being held just the proper distance apart by the spreader-bars 4 to allow the projecting lower end of the prism 11 to fit snugly between the horizontal flanges, so that centering-lugs 16 will engage the flanges of the T-frame bars and prevent the lateral displacement of the glasses. When the glasses are in position, with the vertical face 13 of one abutting the vertical face 14 of another, the tie wires or straps 20 are put in place by passing them through the openings 5 in the vertical webs and over the abutting shoulders 15 of the adjacent glasses, these tie wires or straps being pulled tightly into place for securing the glasses upon the T-frame bars, as shown particularly in Fig. 4 of the drawings.

When the glasses are in place upon their supporting-frame, spaces are left at the ends thereof in the angle-bars and upwardly-flaring spaces are left between the flangeless side walls and the vertical webs extending from the horizontal flanges to the surfaces of the tread portions 10, and the cement (indicated by the reference-number 25) is then carefully packed into position, so as to snugly embed the glasses, setting or forming around the outwardly-inclined side walls 12, over the abutting shoulders 15, and in the openings 5 of the vertical webs of the supporting inverted-T-frame bars. When the cement is properly packed in place, the tread-surfaces of the glasses are rubbed clean with oakum or other suitable material in the manner well understood.

By reason of the arched form of glass employed I am enabled to use T-frame bars of larger size and greater strength than has ever heretofore been utilized for vault-light constructions, the hollow form of the glass enabling me to use a glass of larger size without materially increasing the weight or expense and without decreasing the strength of the structure. The arch form of glass supports the tread portion sufficiently above the lower surfaces of the side walls to enable the use of large sizes of T-frame bars. The combination tread portion and prism portion of glasses is of great utility, not only because it affords means for the direct transmission of light to the vault, but also because, combined with the prism portions, it utilizes the refracted light. By the provision of the centering-lugs I am enabled to dispense with the flanges on the side walls of the glasses in previous constructions.

Having thus described my invention, the following is what I claim as new therein and desire to secure by Letters Patent:

1. A vault-light glass of arch form constructed with a tread, supporting side walls and a centering depending lug between the side walls and projecting beneath the latter for preventing lateral movement of the glass.

2. A vault-light glass of arch form constructed with a tread, supporting side walls, horizontal shoulders and a depending shallow web for bracing the side walls.

3. A vault-light glass of arch form constructed with a tread, supporting side walls, a prism located between the side walls and having a centering depending lug projecting beneath the side walls for preventing lateral movement of the glass.

4. A vault-light glass of arch form constructed with a tread, outwardly-inclined supporting side walls, horizontal shoulders, a prism flush with one end of the glass located between the side walls and having a centering depending lug projecting beneath the side walls for preventing lateral movement of the glass.

5. A vault-light construction comprising a supporting-frame, consisting of angle-bars, parallel frame-bars having horizontal flanges and vertical webs and supported by their ends upon the angle-bars, glasses supported upon the horizontal flanges of the frame-bars, and binding material in which the glasses are embedded.

6. A vault-light construction comprising parallel frame-bars having horizontal flanges and vertical webs, glasses having outwardly-inclined side walls, supported on the horizontal flanges, and arranged end to end, and providing upwardly-flaring spaces in connection with the vertical webs, and binding material filling the spaces.

7. A vault-light construction comprising parallel frame-bars having horizontal flanges and vertical webs, glasses having outwardly-inclined flangeless side walls supported on the horizontal flanges and arranged end to end, and providing upwardly-flaring spaces in connection with the vertical webs extending from the base of the side walls, and binding material filling the spaces.

8. A vault-light construction comprising parallel frame-bars having horizontal flanges and vertical webs, glasses supported on the horizontal flanges and arranged end to end, each glass having a centering depending lug projecting between the horizontal flanges for preventing lateral movement of the glasses, and binding material filling the spaces between the glasses and the vertical webs.

9. A vault-light construction comprising a supporting-frame consisting of angle-bars having horizontal flanges, parallel frame-bars having horizontal flanges and vertical webs, and supported by their ends upon the angle-bars, and spreader-bars having slots receiving the upper edges of the vertical webs of the frame-bars and located over the horizontal flanges of the angle-bars, glasses supported upon the horizontal flanges of the frame-bars and binding material in which the spreader-bars and glasses are embedded.

10. A vault-light construction comprising parallel frame-bars having horizontal flanges and vertical webs formed with openings at intervals, glasses supported upon the horizontal flanges and arranged end to end with their abutting faces in the same vertical planes as the openings in the vertical webs of the frame-bars, and binding material in which the glasses are embedded extending through the said openings.

11. A vault-light construction comprising parallel frame-bars having horizontal flanges and vertical webs formed with openings at intervals, glasses having outwardly-inclined side walls, supported on the horizontal flanges, and arranged end to end with their abutting ends in the same vertical planes as the openings in the vertical webs of the frame-bars and providing, in connection with the webs, upwardly-flaring spaces, and binding material filling the spaces.

12. A vault-light construction comprising a supporting-frame consisting of angle-bars having horizontal flanges, parallel frame-bars having horizontal flanges and vertical webs formed with openings and supported by their ends upon the angle-bars, glasses supported upon the horizontal flanges of the frame-bars, and binding material, in which the glasses are embedded, extending through the openings in the vertical webs of the frame-bars.

13. A vault-light construction comprising a supporting-frame consisting of angle-bars having horizontal flanges, parallel frame-bars having horizontal flanges, and vertical webs formed with openings and supported by their ends upon the horizontal flanges of the angle-bars and spreader-bars having slots receiving the upper edges of the vertical webs of the frame-bars and located within the angle-bars, glasses supported by their ends upon the horizontal flanges of the frame-bars and binding material in which the spreader-bars and glasses are embedded, extending through the openings in the webs of the frame-bars.

14. A vault-light construction comprising a supporting-frame consisting of angle-bars having horizontal flanges, parallel frame-bars having horizontal flanges and vertical webs formed with openings and supported by their ends upon the angle-bars, glasses having horizontal shoulders and supported upon the horizontal flanges of the frame-bars, straps extending over the horizontal shoulders and through the openings in the vertical webs, and binding material in which the glasses and straps are embedded, extending through the openings in the vertical webs of the frame-bars.

15. A vault-light construction comprising parallel frame-bars having horizontal flanges and vertical webs formed with openings at intervals, glasses supported upon the horizontal flanges, and each having abutting horizontal shoulders and a strap extending through the web-openings and over the horizontal shoulders, and binding material in which the glasses and vertical webs are embedded extending through the web-openings.

16. A vault-light construction comprising a frame constructed with angle-bars having horizontal flanges, parallel frame-bars having horizontal flanges and vertical webs formed with openings at intervals, and spreader-bars having slots receiving the upper edges of the vertical webs of the frame-bars and located over the horizontal flanges of the angle-bars, glasses supported upon the horizontal flanges and each having abutting horizontal shoulders and straps extending through the web-openings and over the horizontal shoulders, and binding material in which the glasses, vertical webs, and spreader-bars are embedded extending through the web-openings and beneath the spreader-bars.

WILLIAM L. CALDWELL.

Witnesses:
   CHAS. P. ROGERS,
   WM. E. KNIGHT.